United States Patent [19]

Rodriguez et al.

[11] Patent Number: 4,679,824
[45] Date of Patent: Jul. 14, 1987

[54] FLUID-TIGHT COUPLING FOR TWO SECTIONS OF A FLUID LINE

[75] Inventors: Francis Rodriguez, Vertou; Jean-Paul Roblin, Nantes, both of France

[73] Assignee: Alsthom, Paris, France

[21] Appl. No.: 843,413

[22] Filed: Mar. 24, 1986

[30] Foreign Application Priority Data

Mar. 22, 1985 [FR] France ................. 85 04303

[51] Int. Cl.⁴ ............................................. F16L 35/00
[52] U.S. Cl. ...................................... 285/27; 285/45; 285/332; 285/348; 285/356
[58] Field of Search .................. 285/18, 24, 27, 45, 285/170, 190, 196, 332, 338, 343, 346, 348, 356, 375; 166/338, 339, 340, 344; 405/169, 170

[56] References Cited

U.S. PATENT DOCUMENTS

| | | | |
|---|---|---|---|
| 1,726,483 | 8/1929 | Giesler | 285/45 X |
| 1,969,531 | 8/1934 | Swedler et al. | 285/356 X |
| 1,993,878 | 3/1935 | Dodge | 285/375 X |
| 2,852,281 | 9/1958 | Ellis | 285/343 X |
| 3,768,839 | 10/1973 | Thompson | 285/15 |
| 3,827,258 | 8/1974 | Kammerer, Jr. et al. | 285/18 X |
| 4,006,921 | 2/1977 | Mohr | 285/348 X |
| 4,489,959 | 12/1984 | Satterwhite | 285/348 X |
| 4,577,892 | 3/1986 | Wrülich et al. | 285/190 X |

FOREIGN PATENT DOCUMENTS

1212017 3/1966 Fed. Rep. of Germany .
2506424 11/1982 France .

*Primary Examiner*—Cornelius J. Husar
*Assistant Examiner*—Anthony Knight
*Attorney, Agent, or Firm*—Sughrue, Mion, Zinn, Macpeak and Seas

[57] ABSTRACT

In a fluid-tight coupling comprising a male fitting (1) having an axial channel (2) issuing to the outside via a radial opening (3) and forming the first section of the fluid line, said coupling requiring the male fitting to penetrate into a bore (6) in a mating part (5) containing the second section of said fluid line (4) issuing into the bore in line with the radial opening (3) when coupling is made and the male fitting (1) carrying two seals, located respectively above and below the radial opening, an improvement protects the seals against damage on insertion, wherein the upper seal (8) is secured between a conical shoulder (10) on the male fitting and a sliding ring (11) around the fitting, having a radial through-hole (17), the lower seal (9) is secured between same said ring and the conical top surface (12) of a sliding bushing (13) fitted over the end of the male fitting and the bore of the mating part has a shoulder (19) such that at the time of coupling the bushing (13) bumps said shoulder (19) and slides upwardly relative to the male fitting, compressing the seals (8, 9) so that they expand radially following the oblique containing walls (10, 12).

3 Claims, 3 Drawing Figures

FLUID-TIGHT COUPLING FOR TWO SECTIONS OF A FLUID LINE

This invention concerns a fluid-tight coupling for joining two sections of a fluid line, of the type comprising a cylindrical male fitting containing an axial channel issuing to the outside via a radial opening, said channel constituting the first section of the said fluid line, said fitting being designed to fit into a bore machined into a mating part therefor, the second section of the said first line being formed in said mating part and issuing into said bore, and the issuing orifice being aligned with said radial opening when the male fitting has been driven home.

BACKGROUND OF THE INVENTION

In the known couplings of this type, sealing of the fluid line is provided, within the coupling, by two ring seals secured in grooves of the male fitting, to each side of said radial opening.

At the time of coupling the male fitting penetrates into the bore. But the seals, in order to fulfill their function, necessarily have outside diameters greater than that of the bore and consequently there is a severe risk of the seals tearing as they enter the bore. It has been generally attempted to limit this risk by providing a chamfer at the start of the bore and very carefully inserting the male fitting coaxially with the bore.

Nevertheless, the conditions in which such couplings are made do not always allow these precautions to be observed, especially where hydraulic couplings for submarine installations are concerned.

The present invention is directed to eliminating such risk of seal damage.

SUMMARY OF THE INVENTION

Accordingly, the invention provides, in a fluid-tight coupling for two sections of a fluid line of the type comprising a cylindrical male fitting containing an axial channel issuing to the outside via a radial opening, said channel constituting the first section of the said fluid line, said fitting being designed to fit into a bore machined into a mating part therefor, the second section of said fluid line being formed in said mating part and issuing into said bore, the issuing orifice being aligned with said radial opening when the male fitting has been driven home, said male fitting being provided with two ring seals located one on each side of the said radial opening, an improvement whereby the seal furthest from the end of the fitting, termed the upper seal, is axially secured between a shoulder on the fitting and a sliding ring fitted over said fitting and having a radial through-hole, the other seal, termed the lower seal, being axially secured between said sliding ring and a sliding bushing fitted over the end of the fitting; whereby said bore is given a shoulder to block the said sliding bushing in the course of the fitting's penetrating the bore; whereby the walls respectively in contact with the upper seal and lower seal cooperate with said seals such that the seals are compressed by the axially sliding bushing as said bushing is stopped by the said bore shoulder whilst the fitting continues to penetrate the bore, and expand radially to apply firmly to the wall of said bore; and whereby said seals are given an outside diameter when not compressed which is very slightly smaller than that of said bore in the mating part.

According to a preferred embodiment of the invention, said seals are protected, prior to the male fitting's insertion into the said bore, by a sleeve that is urged by elastic means towards said sliding bushing.

According to another preferred embodiment, said shoulder on the fitting forms a conical bearing surface for said upper seal, the surface of said sliding bushing contacting the said lower seal being likewise conical, and the bottom end of said bushing is also provided with a conical chamfer for centering purposes in the bore.

The invention will now be described in detail with reference to the appended drawings.

DESCRIPTION OF THE PREFERRED EMBODIMENT

Figure 1:
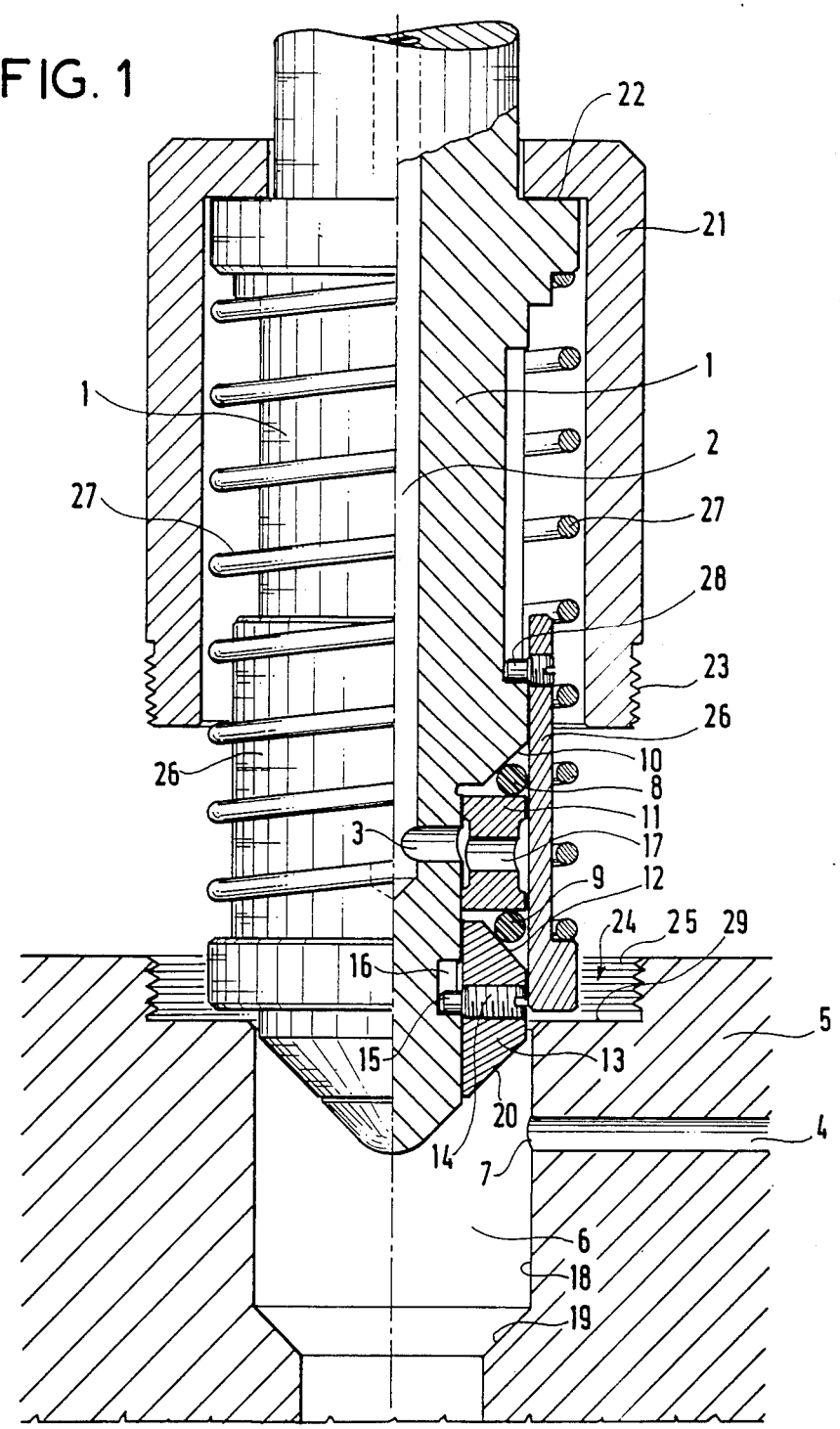
FIG. 1 is an axial, partly cut-away view of a fluid-tight coupling according to the invention, prior to coupling.

As can be seen in FIG. 1, the coupling includes a cylindrical male fitting 1 which contains a drilled axial channel 2 issuing outwardly via a radial opening 3. Said axial channel 2 and radial opening 3 constitute a first section of the line to be joined in a fluid-tight manner with a second line section 4 machined into a mating part 5 for the male fitting 1.

To this end, the receiving, mating part 5 is given a bore 6 into which issues the second section of the fluid line 4 and in which the male fitting 1 must penetrate to accomplish the fluid-tight coupling of the two line sections. The issuing orifice 7 of the second line section 4 in the bore 6 is so located that it will align with the radial opening 3 when the male fitting 1 has been driven home in bore 6 (see FIG. 3). Said second line section 4 is shown as being straight and horizontal in all the figures for comparability between the drawings but need not in fact be so designed, this being merely a convenient example.

Seals are provided around the male fitting 1 to each side of the radial opening 3, namely upper O-ring 8 and lower O-ring 9. The upper O-ring 8 is axially disposed between a conical shoulder 10 on the male fitting 1 and a sliding ring 11; the lower O-ring 9 is axially disposed between same said ring 11 and a conical wall 12 of a sliding bushing 13 fitted over the end of the male fitting 1. The bushing 13 is equipped with an adjusting screw 14 the tip 15 whereof fits into an oblong hole 16 in the male fitting 1 to limit the downward movement of the bushing. In the position illustrated in FIG. 1, ie. before coupling, said sliding bushing 13 is in bottom position, so that the O-rings are not compressed, or hardly so. In this condition their outside diameter is very slightly smaller than that of the bore 6 in the receiving, mating part 5. The male fitting 1 can thus be inserted without damaging the seals, as is clearly shown in FIG. 2.

In order to enable hydraulic communication between the two line sections upon completion of coupling, the sliding annular ring 11 is provided with a radial through-hole 17.

In order to enable, at the time of coupling and penetration of the male fitting 1 into the bore 6, the sliding bushing 13 to slide upwardly so as to compress the seals 8, 9 and effectively seal the coupling by a radial expansion of the seals pressing them against the wall 18 of the bore 6, said bore 6 is provided with a shoulder 19 to arrest and hold the sliding bushing 13. This shoulder is conically tapered and cooperates with a matching conical taper 20 on the bottom end of the bushing 13, thus providing a centering cone in the bore 6. Radial expansion of the O-rings 8 and 9 is induced by the conical walls 12 and 10.

Figure 3:
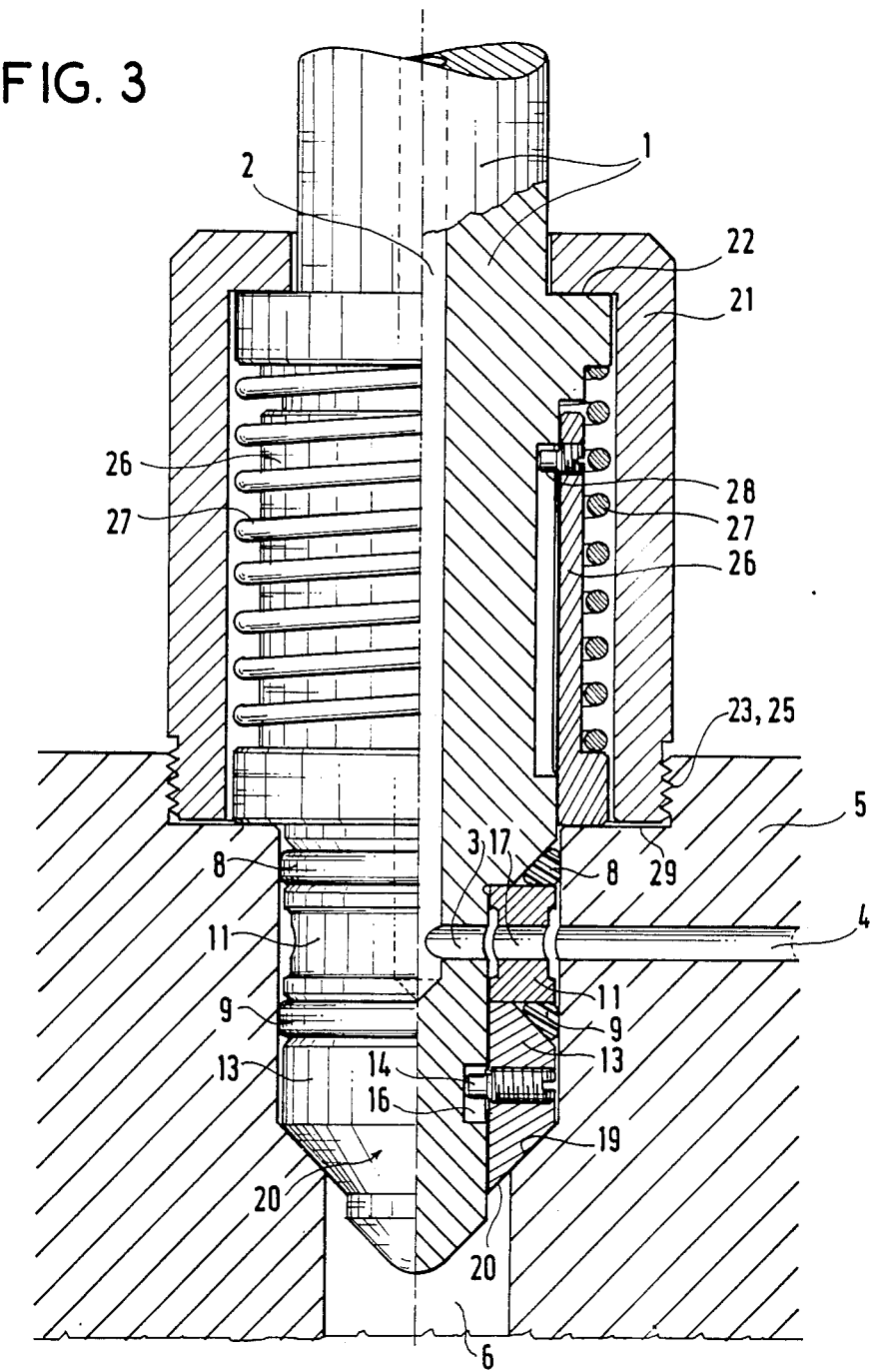
FIG. 3 shows the device as definitely coupled.

FIG. 3 shows the coupling in final, coupled configuration, with the seals radially expanded and applied firmly to the wall 18 of the bore 6. For mechanical attachmennt of the male fitting 1 to the mating part 5, the male fitting is equipped with a ferrule 21 that bears against a shoulder 22 on the male fitting and has an outside thread 23 on the bottom. This ferrule 21 thus screws into the top of the mating part 5, in a counterbore 24 having threads in its cylindrical wall 25, to complete the coupling, as shown in FIG. 3.

The seals 8 and 9 are protected prior to, and in the initial stage of coupling, by a sleeve 26 urged downwardly, ie. toward bushing 13 and partly covering bushing 13, by a spring 27. A stop screw 28 limits the sleeve's downward excursion.

Figure 2:
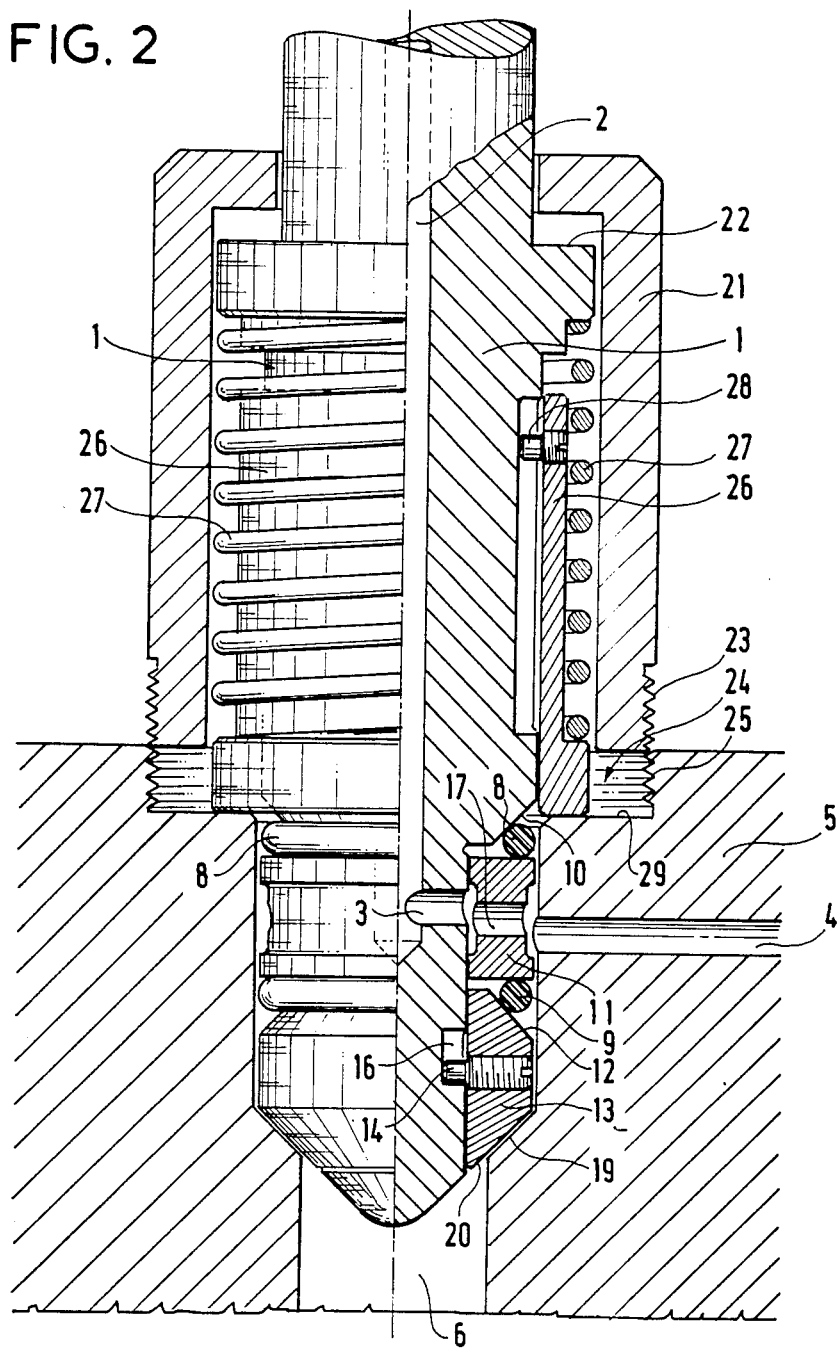
FIG. 2 shows the same coupling as FIG. 1, also partly cut away, at a stage near final coupling.

In the process of coupling, the bottom end of the sleeve bears against the bottom 29 of the counterbore 24 and thus slides upwardly relative to the male fitting 1, exposing the seals. In FIG. 2 the coupling is seen in intermediate position with the bushing 13 still down, but having just bottomed against the bore shoulder 19. Continued downward insertion of male fitting 1 causes the bushing 13 to slide upwardly relative to the fitting and to compress the resilient seals 8, 9 so that they expand radially thanks to the angled surfaces 10 and 12. At the same time, the ring 11 is likewise urged to slide upwardly relative to fitting 1.

The final coupling position is shown in FIG. 3; the seals are pressed against the wall of the bore, and the ferrule 21 is screwed in fully to couple the parts. The seals 8 and 9 may be made for example of elastomer and are elastically deformable.

Thus, thanks to the invention, there is no longer any danger that the seals, whose outside diameters are not greater than that of the bore 6, or even of the bushing 13, will be damaged during coupling. Moreover, thanks to the presence of the sleeve 26, the male fitting 1 can even be left hanging for some time above the mating part 5 prior to coupling without risking damage of the seals by impact or abrasion of nearby equipment. One specific exemplary application of the invention is in the coupling of hydraulic control lines for actuating end effectors in a submarine petroleum production installation. However, the invention can meet many other requirements.

We claim:

1. A fluid-tight coupling for two sections of a fluid line, comprising a cylindrical male fitting containing an axial channel, a radial opening in said cylindrical male fitting connecting said axial channel to the outside, said channel constituting a first section of said fluid line, said male fitting being sized to fit slidably into a bore machined into a mating part therefor, a second section of said fluid line being formed in said mating part and opening into said bore, the issuing orifice of said second line section being aligned with said radial opening in said male fitting when the male fitting has been driven home, said male fitting being provided with two axially spaced, upper and lower ring seals located one on each side of said radial opening, said upper seal being furthest from the end of the male fitting and axially secured between a shoulder on the male fitting and a sliding ring on the male fitting, said sliding ring having a radial through-hole alignable with said radial opening of said male fitting and said issuing orifice of said second line section, said lower seal being axially secured between said sliding ring and a sliding bushing fitted over the end of the male fitting, said bore comprising a shoulder blocking said sliding bushing in the course of the male fitting penetrating the bore, said sliding ring having walls at opposite ends respecrtively in contact with the upper seal and the lower seal and wherein said seals have an outside diameter when uncompressed which is slightly smaller than that of said bore in the mating part such that the seals are compressed by the axially sliding bushing being stopped by said bore shoulder as the male fitting penetrates the bore and said seals are expanded radially to apply firmly against the wall of said bore.

2. A fluid-tight coupling as in claim 1, further comprising an axially slidable sleeve concentrically mounted about said cylindrical male fitting and in peripheral contact with said seals, wherein said seals are protected, prior to the male fitting's insertion into said bore, by said sleeve, and elastic means urging said sleeve axially towards said sliding bushing.

3. A coupling according to claim 1 or claim 2, wherein said shoulder on the male fitting forms a conical bearing surface for said upper seal and wherein the surface of said sliding bushing contacting said lower seal is likewise conical, and said sliding bushing having a bottom end provided with a conical chamfer and said bore shoulder being conical for contacting said sliding bush conical chamfer for centering said male fitting in the bore.

* * * * *